United States Patent [19]

Houri et al.

[11] Patent Number: 4,775,934
[45] Date of Patent: Oct. 4, 1988

[54] METHOD FOR CONCURRENT LOGIC PROGRAM

[75] Inventors: Avshalom Houri, Netovot; Ehud Y. Shapiro, Rehovot, both of Israel

[73] Assignee: Yeda Research and Development Co., Rehovot, Israel

[21] Appl. No.: 875,117

[22] Filed: Jun. 17, 1986

[51] Int. Cl.⁴ .............................................. G06F 9/06
[52] U.S. Cl. ..................................... 364/300; 364/200
[58] Field of Search ................. 364/200 MS, 300, 900

[56] References Cited

U.S. PATENT DOCUMENTS

| | | | |
|---|---|---|---|
| 4,318,182 | 3/1982 | Bachman et al. | 364/300 X |
| 4,374,409 | 2/1983 | Bienvenu et al. | 364/200 |
| 4,410,940 | 10/1983 | Carlson et al. | 364/300 X |
| 4,455,602 | 6/1984 | Baxter, III et al. | 364/200 |

Primary Examiner—Thomas M. Heckler
Assistant Examiner—Paul V. Kulik
Attorney, Agent, or Firm—Pennie & Edmonds

[57] ABSTRACT

A suspension list is maintained for each variable on which one or more processes has been suspended because the variable is uninstantiated. The suspension list for each variable is a circular list of suspension records, each record in the list being associated indirectly with one process that is suspended because that variable is uninstantiated. Each record comprises a first pointer to a memory address or register (called a "hanger") at which is stored the address of the process record for the suspended process and a second pointer that points to the memory address of the next record in the suspension list. Since, the same process can be suspended on different variables, it can happen that records in more than one suspension list point to the same hanger at which is stored the address of the process record for that process. If a variable is subsequently instantiated, each record in the suspension list associated with that variable is used to identify one of the processes that has been suspended on that variable. Accordingly each such process can then be enqueued in the process queue. At the same time, as each process is identified by the record in the suspension list, the address of the process record that is stored in the hanger is reset, illustratively, to zero. As a result, if at a later time another variable is instantiated and the suspension list for that variable also contains a record that points to the same hanger, the hanger will be found to point to its reset value rather than the address of the process record. Consequently, the process will not be identified a second time and will not be enqueued again in the process queue.

6 Claims, 3 Drawing Sheets

FIG. 1

| Memory Address | First Pointer | Second Pointer |
|---|---|---|
| 051 | Variable A | 104 |
| 052 | Variable B | 114 |
| 053 | Variable C | 124 |
| 054 | Variable C | 134 |
| . | . | . |
| 101 | 201 | 102 |
| 102 | --- | 104 |
| 103  11 | 202 | 101 |
| 104 | 203 | 103 |
| 105 | . | . |
| . | . | . |
| 111 | 202 | 112 |
| 112 | --- | 114 |
| 113  12 | 204 | 111 |
| 114 | 206 | 113 |
| . | . | . |
| 121 | 202 | 122 |
| 122 | --- | 124 |
| 123  13 | 203 | 121 |
| 124 | 204 | 123 |
| . | . | . |
| 131 | 203 | 132 |
| 132 | --- | 134 |
| 133  14 | 204 | 131 |
| 134 | 206 | 133 |
| . | . | . |
| 201 | 301 | |
| 202 | 302 | |
| 203 | 303 | HANGER |
| 204 | 304 | |
| 205 | 305 | |
| 206 | 306 | |
| . | | |
| 301 | Process Record 1 | |
| 302 | Process Record 2 | |
| 303 | Process Record 3 | |
| 304 | Process Record 4 | |
| 305 | Process Record 5 | |
| 306 | Process Record 6 | |

COMPUTER MEMORY 10

| Memory Address | Tag | Value |
|---|---|---|
| 051 | var | 105 |
| 052 | var | 115 |
| 053 | var | 125 |
| 054 | var | 135 |
| . | . | . |
| . | . | . |
| 101 | list ref | 201 |
| 102 | ref | 105 |
| 103 | list ref | 202 |
| 104 | ref | 101 |
| 105 | list ref | 203 |
| 106 | ref | 103 |
| . | . | . |
| . | . | . |
| 111 | list ref | 211 |
| 112 | ref | 115 |
| 113 | list ref | 212 |
| 114 | ref | 111 |
| 115 | list ref | 213 |
| 116 | ref | 113 |
| . | . | . |
| . | . | . |
| 121 | list ref | 221 |
| 122 | ref | 125 |
| 123 | list ref | 222 |
| 124 | ref | 121 |
| 125 | list ref | 223 |
| 126 | ref | 123 |
| . | . | . |
| . | . | . |
| 131 | list ref | 231 |
| 132 | ref | 135 |
| 133 | list ref | 232 |
| 134 | ref | 131 |
| 135 | list ref | 233 |
| 136 | ref | 133 |
| . | . | . |
| . | . | . |
| 201 | ref | 301 |
| 202 | ref | 302 |
| 203 | ref | 303 |
| 204 | ref | 304 |
| 205 | ref | 305 |
| 206 | ref | 306 |
| . | . | . |
| . | . | . |
| 301 | ref | (address of Proc Rec 1) |
| 302 | ref | (address of Proc Rec 2) |
| 303 | ref | (address of Proc Rec 3) |
| 304 | ref | (address of Proc Rec 4) |
| 305 | ref | (address of Proc Rec 5) |
| 306 | ref | (address of Proc Rec 6) |

METHOD FOR CONCURRENT LOGIC PROGRAM

CROSS-REFERENCE TO RELATED APPLICATION

A related application is application Ser. No. 807,552 "Method and Apparatus for Implementing a Concurrent Logic Program", filed concurrently herewith and incorporated herein by reference.

BACKGROUND OF THE INVENTION

This relates to a method for operating a logic program and, in particular, to a method for handling suspended processes in a logic program.

A logic program is a set of axioms defining relationships between objects. A computation of a logic program is a deduction of the consequences of the axioms. Most logic programming languages require the axioms to be Horn clauses which are axioms having the form:

A if $B_1$ and $B_2$ and ... and $B_n$

This definition requires the axioms to consist only of assertions (i.e., A), denials (i.e., not A) and implications (i.e., A if $B_1$ and $B_2$ and ... and $B_n$) The first part of a clause (i.e., A) will be referred to as the head or consequence of the clause and the remainder (i.e., $B_1$ ... $B_n$) as the body or the tail or condition or antecedent. We will refer to assertions and denials as facts and to implications as rules and any of these may be referred to as a clause or axiom.

Logic programming languages of this type include sequential Prolog, PARLOG, Guarded Horn Clauses, and Concurrent Prolog. Extensive material has been published on logic programming and on these programming languages. See, for example, R. A. Kowalski, *Logic for Problem Solving* (Elsevier North Holland, 1979); D. H. D. Warren, "An Abstract Prolog Instruction Set", Technical Note 309 (SRI International 1983); C. J. Hogger, *Introduction to Logic Programming* (Academic Press 1984); W. F. Clocksin and C. S. Mellish, *Programming in Prolog* (Springer-Verlag, 2d Ed. 1984); T. Conlon, *Learning MicroProlog* (Addison-Wesley 1985); K. Ueda, "Guarded Horn Clauses", ICOT Technical Report TR-103 (1985); E. Shapiro "Concurent Prolog: A Progress Report" Technical Report CS86-10, Weizmann Institute, Israel (1985); U. Bar-On, "A Distributed Implementation of Flat Concurrent Prolog," Thesis, Dept. of Applied Mathematics, Weizmann Institute, Israel (1986); L. Sterling and E. Shapiro, *The Art of Prolog: Advanced Programming Techniques*, (MIT Press 1986).

Kowalski realized that Horn clauses could be read both declaratively, saying that A is true if $B_1$ and $B_2$ and ... and $B_n$ are true, and procedurally, saying that to prove the goal A (or execute procedure A or solve problem A) one can prove subgoals (or execute subprocedures or solve subproblems) $B_1$ and $B_2$ and ... and $B_n$. R. A. Kowalski, *Logic for Problem Solving* (Elsevier North Holland 1979).

For example, the following program identifies objects X that appear in both lists L1 and L2 (i.e., list intersection):

intersect (X, L1, L2): - member (X, L1) and member (X, L2). member (X, [X|Xs]).

member (X, [Y|Ys]): - member (X, Ys).

Read declaratively, the first axiom reads: X is in the intersection of list L1 and L2 if X is a member of list L1 and X is a member of list L2. Read procedurally, the first axiom reads: to find an X in the intersection of lists L1 and L2, find an X which is a member of L1 and also a member of L2. The term [X|Xs]is standard list notation denoting a list whose first element is X and whose remaining elements are Xs. The axioms defining "member" read: X is a member of the list whose first element is X and X is a member of the list [Y|Ys] if X is a member of Ys. The determination of membership in a list is a recursive process explained, for example, in Chapter 5 of *Learning MicroProlog*.

From Kowalski's insight a computational model for logic programs was derived. This model is based on the following principles:

A logic program is a finite set of universally quantified axioms.

An execution is the proof of an existential statement from the program.

The basic proof procedure is non-deterministic.

The proof of a goal from a logic program establishes the existence of an instance of the goal which follows from the program and also provides values for the goal variables defining such an instance. These values constitute the output of the computation. There may be many different successful computations of a goal, each resulting in a different output.

For example, in the list intersection program, let L1 be the list [2,4,6,8,10,12] and L2 the list [3,6,9,12,15]. If we then seek to prove the goal: does there exist an X such that: intersect (X, [2,4,6,8,10,12], [3,6,9,12,15]), the logic program will identify each member of list L1 and seek to establish that such member is identical to a member of list L2. Outputs for this goal will be X=6 and X=12

The basic computation steps of a logic program proof procedure are (1) the unification of a goal with the head of a clause and (2) its reduction to (or replacement by) the subgoals specified in the body of the clause. The unification procedure is a specialized form of Robinson,s resolution principle. J. A. Robinson, "A Machine-oriented Logic Based on the Resolution Principle", *Journal of the ACM*. vol. 12, pp. 23-41 (1965). Unification of two terms involves finding values that may be substituted for variables in the terms so as to make the two terms identical. See, for example, C. J. Hogger, *Introduction to Logic Programming*, p. 217 (Academic Press 1984). The usual logic program task is to satisfy a conjunction of unsolved goals, which are referred to as the resolvent, by searching a database to locate facts that will unify with a goal. The various logic programming languages approximate the foregoing model and differ mainly in the manner in which the proof of a goal is constructed.

The axioms of a logic programming language are built from terms. A term is either a constant, a variable or a structure. Constants name specific objects or relationships. Variables function as pronouns in that they represent an object that cannot be named. A structure is a single object which consists of a collection of other objects. It is written in the form: f(a,b,c) where f is called the functor or predicate and the terms in parentheses are called components or arguments. A fact is written as a structure specifying a relationship between two or more objects. In such a structure, the relationship is written as the functor or predicate and the objects are written as the components or arguments. Thus the fact "John likes Mary" may be written as: likes (john, mary). A typical query to a database will have the form: ?- f(a,X) where X is a variable representing the sought after information. When it is not known what this variable stands for, the variable is uninstantiated. When the variable does stand for an object, it is instantiated.

The query provides a conjunction of goals to be satisfied. The logic programming language Prolog satisfies these goals in a sequential approximation to the logic programming model using a technique called depth first searching with backtracking. To answer a query, Prolog uses the known clauses in the database to satisfy the goals. A fact can cause a goal to be satisfied immediately if the goal unifies with the fact. A rule can only reduce the task to one of satisfying a conjunction of subgoals and can do so only if the goal unifies with the head of the rule. For example, to answer a query containing one variable, Prolog searches through the database seeking a structure having the same functor and the same components except for the variable in the same positions within the structure. If such a match is found, the variable is instantiated to the object at the corresponding position within the structure.

If a goal cannot be satisfied immediately, backtracking is initiated to find an alternative way to satisfy the goal. Thus, to satisfy a goal, Prolog searches sequentially for the first clause in the database which matches the goal and reduces this goal using that clause. Prolog then tries to solve the reduced goal instantiating variables as it goes. This is called depth first searching. If Prolog ever fails to solve a goal because all the possible clauses for a match have been tried and failed to match, then it backtracks to the last clause chosen and attempts to find an alternative clause for the appropriate goal. As part of this backtracking it uninstantiates all variables that were instantiated in the course of the prior attempt to satisfy the goal.

For example, the database may comprise the facts:
likes (john, mary)
likes (robert, susan)
likes (michael, mary)
likes (paul, wendy)
likes (john, wendy)
likes (michael, susan)
likes (robert, wendy)
likes (robert, mary)
If the query is:
?- likes (X, mary) and likes (X, wendy),
the program searches through the database to find the first person who likes Mary. The first fact indicates the John likes Mary and the variable X is instantiated to john. To satisfy the second subgoal, the program then checks to see if John likes Wendy. It locates this fact in the data base and reports that X=john in satisfaction of the query. The program then resets the variable and searches for someone else who likes Mary and Wendy. It locates the fact that Michael likes Mary, and the variable X is instantiated to michael. However, further search of the database does not locate the fact that Michael likes Wendy. According, the program backtracks to the fact that Michael likes Mary, uninstantiates the variable and resumes the search for other facts relating to who likes Mary. Next, it finds the fact that Robert likes Mary and instantiates the variable X to robert. It then locates the fact that Robert likes Wendy and reports that X=robert in satisfaction of the query. At this point the search is done.

The policy for removing and adding goals to the resolvent is called the scheduling policy of the interpreter. Prolog's scheduling policy is to maintain the resolvent as a stack. Instead of arbitrarily removing a goal from the resolvent, the first goal in the resolvent stack is popped. The body of the reducing clause is pushed on the resolvent stack, starting from the last goal in the body.

A nondeterministic choice for a reducing clause is simulated by (1) sequential search through the clauses typically in the order in which they appear in the database and a search through the terms of a clause from left to right and (2) backtracking. When attempting to reduce a goal, the first clause in the program whose head unifies with the goal is chosen. If no unifiable clase is found for the popped goal, the computation is unwound to the last choice made of a clause, and the next unifiable clause is chosen.

As will be apparent, a large database and a complicated conjunction of goals will impose a considerable searching burden on any available serial (von Neumann-type) computer. For this reason, it is desirable to perform such searching of the database in parallel and several concurrent programming languages for doing so are presently being developed.

Concurrent programming languages exploit the parallelism inherent in logic programming using both "Andparallelism" and "Or-parallelism" Specifically, all the goals in the body of a clause are reduced in parallel, which is called "And-parallelism"; and a goal is unified with the heads of all applicable clauses in parallel and the bodies of the clauses whose heads unify are solved in parallel, which is called "Or-parallelism".

As an aid to understanding concurrent programming languages, it is useful to analogize certain elements of concurrent programming to sequential logic programming. In particular,

- a process in concurrent programming can be analogized to a goal in sequential Prolog;
- a network of processes can be analogized to a conjunction of goals
- a communication channel between processes or a variable shared by several processes can be analogized to a logical variable shared between two or more goals;
- rules or instructions for process behavior can be analogized to the clauses of a logic program.

In contrast to sequential Prolog, an action taken by a process in concurrent Prolog cannot be undone and backtracking is not permitted. Once a process has reduced itself using some clause, it is committed to it.

The resulting computational behavior is called committed choice nondeterminism or indeterminacy. Because of the use of indeterminacy, process synchronization is required to delay an action until enough information is available to ensure that it is a correct one.

Concurrent Prolog uses two synchronization and control constructs: the read-only annotation and the guarded clause. The read-only annotation (indicated by a question mark) can be added to any occurrence of a variable in a logic program, thereby designating it as read-only. A read-only occurrence of a variable cannot be used to instantiate that variable.

A guarded clause has the form:

$$A:- G_1, G_2, \ldots G_m | B_1, B_2, \ldots, B_n \quad m,n\_0$$

The commit operator, |, separates the right hand side of the rule into a guard, $G_1, G_2, \ldots G_m$, and a body, $B_1, B_2, \ldots, B_n$. Declaratively, it is read just like a conjunction: A is true if the G's and B's are true. Procedurally, he reduction of a process $A_1$ using such clauses suspends until $A_1$ is unifiable with A and the guard is determined to be true. Since the reduction proceeds in parallel, this may be read procedurally as: to solve A, first solve the guards, $G_i$, in parallel and, if successful, solve the goals in the body, $B_j$, in parallel. Thus, to satisfy a goal A, the guards of 11 the clauses in the procedure for A whose heads unify with A are tried in parallel; and when a guard succeeds, this guard commits. The goals in the body of the clause are then executed in parallel.

In concurrent Prolog, the goals, $G_i$, in the guard can be arbitrary programs and the applicability of a clause for reduction can be arbitrarily complex. In a subset of concurrent Prolog known as flat concurrent Prolog, the goals in the guards can contain calls only to a fixed set of simple test-predicates.

The scheduling policy for concurrent Prolog illustratively is to maintain the resolvent as a first-in- first-out queue, in which goals are removed from the front of the queue and are added at its back. This policy is called breadth-first scheduling.

Because a concurrent Prolog database is searched in parallel, it is likely that any one of several processes running in parallel will encounter variables that must be specified for reduction of the process, but are not specified because their value is determined by another process. In practice, a large number of variables are likely to be unspecified at any time with the result that any process may not be able to be reduced because several variables are unspecified and many processes may not be able to be reduced because the same variable is not specified. In the prior art, a process that cannot be reduced is returned to a queue of processes that are waiting to be reduced; and it will be tried again when it is next reached in the queue. As will be apparent this is not efficient if the variables needed for reduction of the process have not been specified at the time of the next try to reduce the

SUMMARY OF THE INVENTION

In concurrent programming it is customary to maintain a process record that identifies the processes that remain to be reduced. The arguments of the process record are (1) a pointer to the code of the procedure for the process, (2) a reference or link that is used to link the processes into a queue which is referred to as the process queue or active queue, and (3) the data objects which represent the arguments of the process.

In accordance with the present invention, a suspension list is maintained for each variable on which one or more processes cannot be reduced because the variable is uninstantiated. The suspension list for each variable is a circular list of suspension records, each record being associated indirectly with one process that is suspended because that variable is uninstantiated. Each record comprises a first pointer to a memory address or register (called a "hanger") at which is stored the address of the process record for the suspended process and a second pointer that points to the memory address of the next record in the suspension list. A pointer at the end of the suspension list points back to the first record in the suspension list; and a header which identifies the variable associated with the suspension list also points to the first record in the suspension list.

When a record is added to the suspension list, it is inserted at the beginning of the list and is given a first pointer that points to the memory address or hanger at which is stored the address of the process record for the suspended process and a second pointer that points to the memory address of the next record in the suspension list. To make the insertion, the header and the pointer at the end of the suspension list are updated so they point to the memory address of the new record.

As indicated, a suspension list is maintained for each variable on which a process is suspended. Since the same process can be suspended on different variables, it can happen that entries in more than one suspension list point to the same memory address or hanger at which is stored the address of the process record for that process.

In accordance with the invention, if a variable is subsequently instantiated, each record in the suspension list associated with that variable is used to identify one of the processes that has been suspended on that variable. Accordingly each such process can then be enqueued in the process queue. At the same time, as each process is identified by the record in the suspension list, the address of the process record that is stored in the hanger is reset, illustratively, to zero. As a result, if at a later time another variable is instantiated and the suspension list for that variable also contains a record that points to the same hanger, the hanger will be found to point to its reset value rather than the address of the process record. Consequently, the process will not be identified a second time and will not be enqueued again in the process queue.

BRIEF DESCRIPTION OF DRAWING

These and other objects, features and advantages of the invention will be more readily apparent from the following detailed description of a preferred embodiment of the invention in which FIG. 1 is a schematic illustration of a portion of computer memory useful in understanding the invention and FIG. 2 is a schematic illustration of a preferred embodiment of the invention.

DESCRIPTION OF PREFERRED EMBODIMENT OF INVENTION

Figure 3:
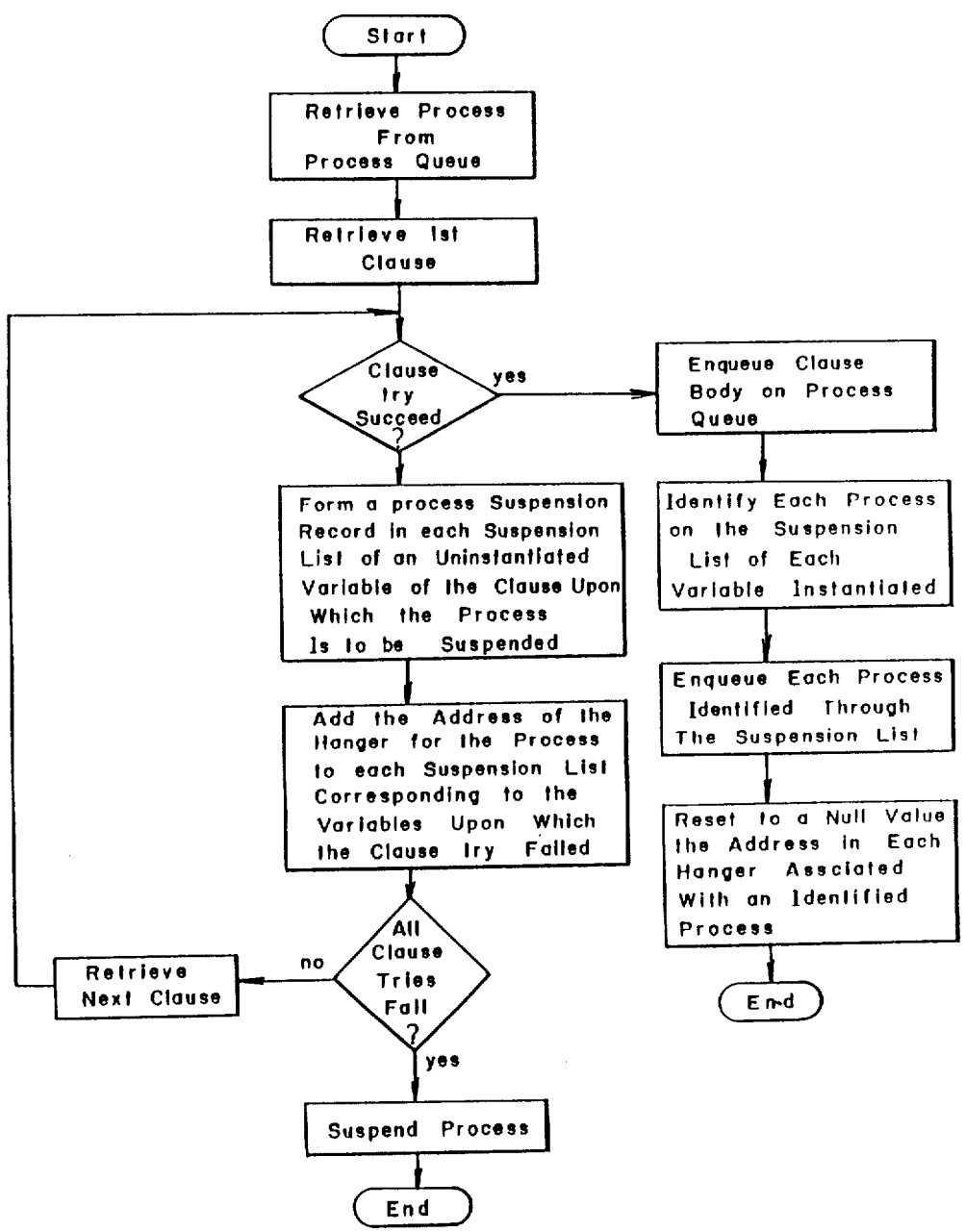
FIG. 3 is a flowchart of the suspension and reactivation processes of one embodiment of the present invention.

In the concurrent programming system in which the invention is practiced, the compiled code for the clauses of the program is grouped according to the principal functor and arity (i.e., number of terms) of the head of each clause. Each such group is called a procedure. The computer program operates by trying to reduce a process to one of the clauses in the procedure. When a clause try fails, the computer program tries to reduce the process to some other clause in its procedure and so on for all the clauses in the procedure. If no untried clause is left and the process is still not reduced, the process is suspended. The entire program accordingly is a series of clause tries collectively referred to as a procedure try.

A program execution proceeds as follows:

1. The first process in the process queue is dequeued and a reduction attempt is made by using the clauses in the associated procedure one after another.

2. If a clause try succeeds, the clause body is enqueued into the process queue and any processes that were suspended on variables which have been changed are enqueued in the process queue. If a clause try fails, the variables on which the process is suspended are recorded in a suspension table and the next clause is tried.

3. If all clause tries fail, the process is suspended on the variables recorded in the suspension table. This program execution sequence is illustrated in the flowchart presented in FIG. 3.

FIG. 1 illustrates a portion of a heap memory stored in a computer memory 10 in accordance with the present invention. The left hand column of the table sets forth the memory addresses at which information is stored. Illustratively, a suspension table is stored at memory addresses beginning with "05", suspension lists are stored at memory addresses beginning with "1", process records are stored at memory addresses beginning with a "3" and pointers or "hangers" to these process records are stored at memory addresses beginning with a "2".

As shown in FIG. 1, each entry in the suspension table contains a header labelled A, B, C or D and a pointer to the first record in one of suspension lists 11, 12, 13, 14 by which the list is associated with that variable. Each list illustratively contains three suspension records and a pointer at the end of the list. Each suspension record for a variable is associated with a process that is suspended on that variable. The suspension record contains two pointers: the first pointer points to the memory address of the hanger associated with that process and the second pointer points to the next record in the suspension list. In FIG. 1, the second column contains the values of the first pointer and the last column contains the values o the second pointer of each suspension record. As a result, the individual records of any suspension list could be located at widely scattered memory locations throughout memory 10 although they are grouped together in FIG. 1 for ease of illustration. The pointer at the end of each suspension list points back to the first record in the list.

When a record is added to a suspension list, it is inserted at the beginning of the list by changing the header pointer to point to the memory address at which the new record is stored and changing the pointer at the end of the suspension list to point to the memory address of the new record as well. The new record is given a first pointer that points to the memory address of the hanger at which is stored the memory address of the procss record for the suspended process and a second pointer that points to the memory address of the next record in the suspension list.

For example, if process 6 becomes suspended on variable A, a new entry can be added to the suspension list for variable A by changing the pointers stored at memory addresses 051 and 102 to 105 and by storing at memory address 105 an entry having a first pointer of 206 and a second pointer of 104.

If a variable becomes instantiated, as illustrated in the righthand side of FIG. 3, the entries of the suspension list associated with that variable are used to identify the processes that are to be enqueued on the process queue. The first pointer of each record is read to identify the memory address of the hanger at which is stored the memory address of the process record. When the memory address of the process record is read from the hanger, that process is added to the process queue. At the same time, the address in the hanger is reset, illustratively, to zero. As a result, if any other variable becomes instantiated, the suspension records associated with that variable will not be able to enqueue processes that previously have been enqueued.

For example, if variable A is instantiated, process records 1, 2 and 3 will be accessed through the hangers at memory addresses 201, 202 and 203. The pointers at these addresses will be reset at the time of such accessing so that they can no longer access these process records. If variable C is later instantiated, process record 4 will be accessed through the hanger at memory location 204 but process records 2 and 3 will not be.

It is possible that different clause tries in a single reduction attempt may cause suspension on the same variable. If a suspension record is generated in the suspension list for each try, more than one record for the same process may be associated with the same variable. To prevent this, the last element of the suspension list advantageously is checked before adding a new record. If the last record references the same hanger as the record about to be added, that record is not added to the list. Thus, no duplicate record for a single reduction attempt will occur in a single suspension list.

The invention preferably is implemented using a tagged architecture in which the information stored at each memory address has a tag that identifies the type of data and a value. As described in more detail in the copending application "Method and Apparatus for Implementing a Concurrent Logic Program", these tags include a variable, a reference and a list. For such a tagged architecture, the pair of pointers associated with a memory address in the illustration of FIG. 1 are stored as tagged values at successive memory addresses. Accordingly, the illustration of FIG. 1 may be stored in a tagged architecture in the form shown in FIG. 2.

As will be apparent to those skilled in the art, numerous modifications may be made following the teachings of the present invention.

What is claimed is:

1. In a logic program in which processes suspend upon a set of variables while waiting for one of them to be instantiated, a method of controlling enqueuing of a suspended process comprising the steps of:
   forming a suspension list for each variable on which at least one process is suspended, said suspension list comprising a record for each process that is suspended on that variable,
   providing in each record in each suspension list a pointer to a memory location containing an address to information concerning said process,
   when one of said variables is instantiated, using a pointer in a record of the suspension list for the instantiated variable to identify a process suspended on that variable,
   enqueuing said identified process onto a process queue for subsequent reduction of the process, and
   preventing another identification of the same process when a variable associated with another suspension list is later instantiated, thereby preventing a second enqueuing of the identified process.

2. The method of claim 1 wherein another identification of the same process is preventing by resetting the address to said information concerning the process.

3. A method of suspending and reactivating processes in a logic program in which processes to be reduced suspend upon at least one variable, said method comprising the steps of:
   forming a suspension list for each variable on which at least one process is suspended, said suspension list comprising a record for each process that is suspended on that variable, providing in each record in each suspension list a pointer to an indirect address to information concerning said process, and when one of said variables is instantiated, reactivating each process suspended on that variable, said method of reactivating comprising the steps of:

using a pointer in a record of the suspension list for the instantiated variable to identify the process suspended on said variable, enqueuing said identified process onto a process queue for subsequent reduction of the process, and preventing another identification of the same process when a variable associated with another suspension list is later instantiated, thereby preventing a second enqueuing of the identified process.

4. The method of claim 3 wherein another identification of the same process is prevented by resetting said indirect address.

5. A method of suspending and reactivating processes in a logic program in which processes to be reduced using a plurality of clauses suspend upon at least one variable which is not instantiated, said method comprising the steps of:

dequeuing a process from a process queue;

attempting to reduce a process using the clauses;

forming a suspension list for each variable which is not instantiated, said suspension list comprising a record for each process that is suspended on that variable;

providing in each record a printer to an indirect address to information concerning said process;

when a variable associated with a suspension list is instantiated, reactivating said identified process, said method of reactivating comprising the steps of:

using a pointer in a record of the suspension list to identify the suspended process;

enqueuing said identified process onto a process queue for subsequent reduction of the process; and preventing another identification of the same process when a variable associated with another suspension list is later instantiated, whereby a second enqueuing of the identified process is prevented.

6. The method of claim 5 wherein another identification of the same process is prevented by resetting said indirect address.

* * * * *